(12) United States Patent
Altschul et al.

(10) Patent No.: US 6,405,056 B1
(45) Date of Patent: Jun. 11, 2002

(54) COMPACT WIRELESS TELEPHONE WITH ENABLING MODULE

(75) Inventors: Randice-Lisa Altschul, Cliffside Park; Lee S. Volpe, Mount Laurel, both of NJ (US)

(73) Assignee: Dieceland Technologies Corp., Cliffside Park, NJ (US)

( * ) Notice: Subject to any disclaimer, the term of this patent is extended or adjusted under 35 U.S.C. 154(b) by 34 days.

(21) Appl. No.: 09/741,719

(22) Filed: Dec. 20, 2000

Related U.S. Application Data

(63) Continuation-in-part of application No. 09/660,130, filed on Sep. 12, 2000.

(51) Int. Cl.[7] .................................................. H04Q 7/20
(52) U.S. Cl. ........................ 455/558; 455/90; 455/550; 455/569; 455/575
(58) Field of Search .......................... 455/90, 550, 557, 455/558, 568, 569, 572, 575; 379/428.01, 428.02, 428.04, 429, 430, 431, 433.01, 433.03, 433.05, 433.09, 434

(56) References Cited

U.S. PATENT DOCUMENTS

| 5,875,393 A | 2/1999 | Altschul et al. |
| 5,965,848 A | 10/1999 | Altschul et al. |

*Primary Examiner*—Nay Maung
(74) *Attorney, Agent, or Firm*—Arthur Jacob

(57) ABSTRACT

A compact modular wireless telephone includes a base unit, a headset selectively connected to and disconnected from the base unit, and a separate card for placement in the base unit to enable telephonic communication. The card includes an identifier for providing a signal identifying a dedicated service account, an interfacer for interfacing the telephone with a service provider for authorization of a telephonic communication, and a selector for placing an authorized telephonic communication, upon interfacing the telephone with the service provider and gaining authorization for the telephonic communication. Telephonic communications are authorized on the basis of the amount of airtime made available in the dedicated service account represented by the card, and the mode of operation of the telephone indicated in the dedicated service account.

12 Claims, 4 Drawing Sheets

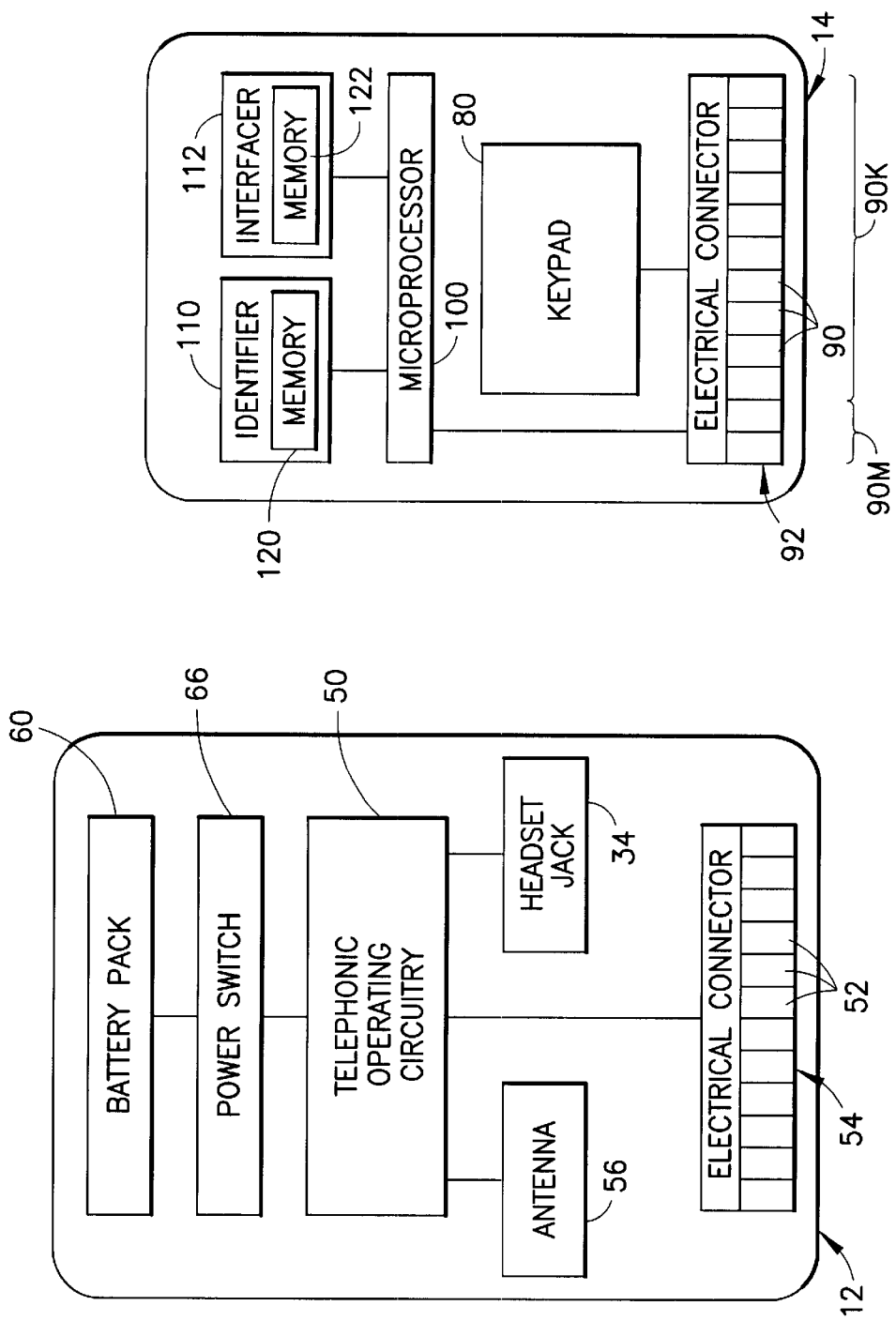

_US 6,405,056 B1_

COMPACT WIRELESS TELEPHONE WITH ENABLING MODULE

This is a continuation-in-part of application Ser. No. 09/660,130, filed Sep. 12, 2000, the substance of which is incorporated herein by reference thereto.

BACKGROUND OF THE INVENTION

1. Field of the Invention

The present invention relates generally to telephonic communications and pertains, more specifically, to a wireless telephone constructed in a compact modular arrangement and having an enabling module allowing the convenient purchase and use of predetermined amounts of airtime.

2. Description of the Prior Art

The construction of highly compact and economical wireless telephones is described in detail in U.S. Pat. Nos. 5,875,393 and 5,965,848, granted to Altschul et al., the substance of which patents is incorporated herein by reference thereto. The present invention provides wireless telephones which are even more compact, and which are constructed for added versatility, convenience and safety in use, as well as for increased economy of manufacture. As such, the present invention provides several objects and advantages, some of which are summarized as follows: Provides a modular arrangement which allows the use of relatively less expensive modules in a wireless telephone suitable for more widespread use and acceptance; enables greater convenience in carrying about and using wireless telephones; allows greater convenience in purchasing and using predetermined amounts of airtime; provides a simplified wireless telephone having both call-out and call-in capabilities; reduces potential hazards associated with electromagnetic radiation emanating from wireless telephones; allows greater convenience in providing power to a wireless telephone; provides greater versatility in the design and function of wireless telephones; enables the economical manufacture and distribution of relatively low-cost, reliable wireless telephones, thereby opening up new and larger markets for wireless telephones.

SUMMARY OF THE INVENTION

The above objects and advantages, as well as further objects and advantages, are attained by the present invention which may be described briefly as a compact modular wireless telephone for telephonic communications, the wireless telephone comprising: an operator module including wireless telephonic operating circuitry, operator electrical connector elements connected to the wireless telephonic operating circuitry, and a power source for supplying power to the wireless telephonic operating circuitry; an enabling module for being supplied separate from the operator module, the enabling module including a body member having limited dimensions, including a limited length, a limited width and a limited thickness, an identifier in the body member for identifying a service account dedicated to the enabling module, an interfacer in the body member, a selector integral with the body member, and enabling electrical connector elements connected to the identifier, the interfacer and the selector, the enabling electrical connector elements being complementary to corresponding operator electrical connector elements; an antenna; an earphone assembly; a microphone assembly; electrical connections for connecting the antenna, the earphone assembly and the microphone assembly with the wireless telephonic operation circuitry; and an interconnect for selectively connecting the enabling electrical connector elements with the operating electrical connector elements such that upon connecting the enabling electrical connector elements with the operating electrical connector elements, signals from the interfacer, the identifier, and the selector are transmitted by the wireless telephonic operating circuitry to interface the wireless telephone with a service provider, to identify the dedicated service account to the service provider for authorization of a telephonic communication, and to establish an authorized telephonic communication.

The invention will be understood more fully, while still further objects and advantages will become apparent, in the following detailed description of preferred embodiments of the invention illustrated in the accompanying drawing, in which:

BRIEF DESCRIPTION OF THE DRAWINGS

FIG. 4 is a schematic diagram of an operating module of the telephone;

FIG. 5 is a schematic diagram of an enabling module of the telephone; and

DETAILED DESCRIPTION OF PREFERRED EMBODIMENTS

Figure 1:
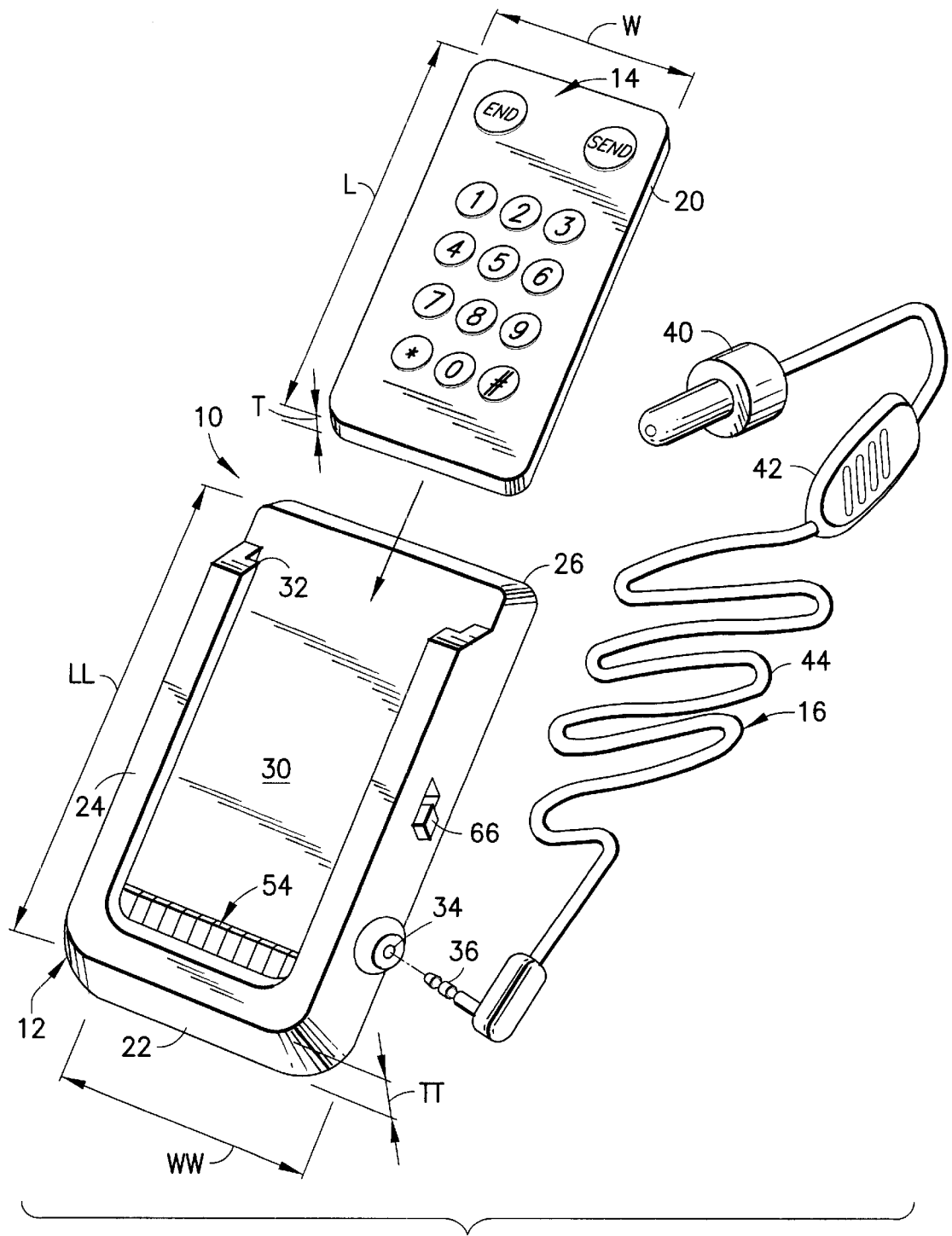
FIG. 1 is an exploded pictorial perspective view showing a compact modular wireless telephone constructed in accordance with the present invention.
Figure 2:
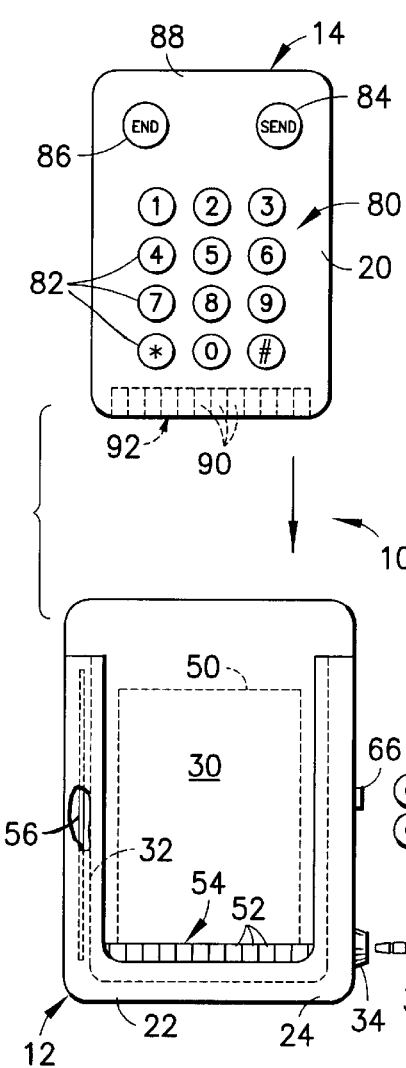
FIG. 2 is a front elevational view of components of the telephone.
Figure 3:
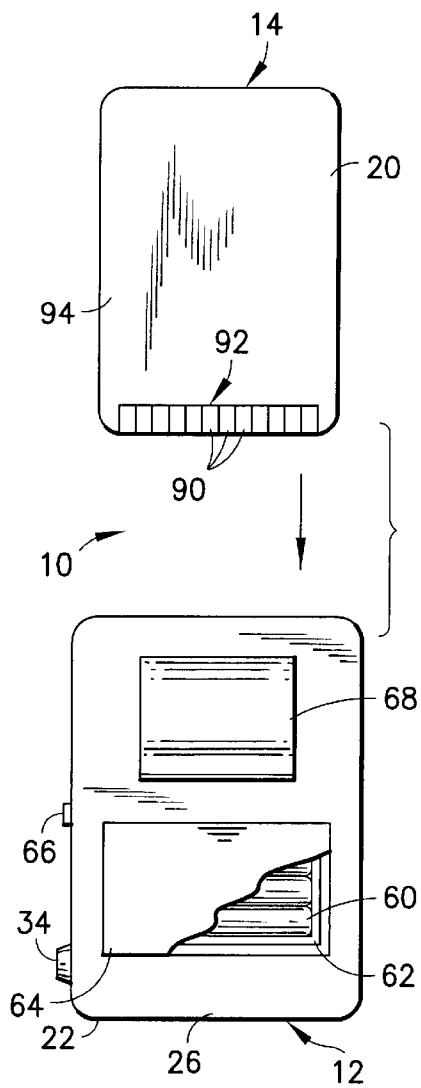
FIG. 3 is a rear elevational view of components of the telephone.

Referring now to the drawing, and especially to FIG. 1 thereof, a compact modular wireless telephone constructed in accordance with the present invention is shown at 10 and is seen to include an operator module in the form of a base unit 12, an enabling module in the form of card 14, and an audio module in the form of a headset 16. Card 14 includes a body member 20 having very limited dimensions, including a limited length L, a limited width W and a limited thickness T. Typically, card 14 is about the size of currently available credit cards, so that length L is just over three inches, width W is about two inches, and thickness T is a fraction of an inch. These compact dimensions are attained by a construction made available through the technology described in aforesaid U.S. Pat. No. 5,965,848, the disclosure of which patent is incorporated herein by reference thereto. Base unit 12 includes a housing 22 which also is provided with limited dimensions, the dimensions of the housing 22 being somewhat greater than the dimensions of body member 20, but still very compact. Thus, for example, housing 22 includes a length LL of about three and three-quarter inches, a width WW of about two and one-half inches, and a thickness TT of about one-half inch, the thickness TT extending between a front face 24 and a back face 26.

An interconnect enables the selective connection of card 14 with base unit 12 and includes a receptacle 30 having a card slot 32 at the front face 24 of the housing 22, the card slot 32 being complementary to at least a portion of the body member 20 of the card 14 for receiving at least the portion of the card 14 within the housing 22. An electrical connection includes a jack 34 in the housing 22 and a plug 36 in the headset 16 for enabling connection of the headset 16 to the base unit 12. Headset 16 includes an earphone assembly shown as an earphone 40 and a microphone assembly shown as a microphone 42, both connected to plug 36 by an elongate cable 44 having appropriate earphone and microphone electrical conductors for effecting the necessary connections so that the earphone 40 and the microphone 42, when connected to the base unit 12, are remote from the base unit 12.

Turning now to FIGS. 2 through 5, as well as to FIG. 1, base unit 12 includes wireless telephonic operating circuitry 50 housed within housing 22 and a plurality of operator electrical connector elements in the form of operating contacts illustrated as electrical contacts 52 of an electrical connector 54 located within the housing 22, juxtaposed with the receptacle 30, and electrically connected to the telephonic operating circuitry 50. An antenna 56 is located in housing 22 and is connected to the telephonic operating circuitry 50. A power source is provided in the form of a battery pack 60 placed within a battery compartment 62 in the housing 22, accessible through a battery access door 64 at the back face 26 of the housing 22, and a power switch 66 selectively controls the supply of power to the telephonic operating circuitry 50. For convenience, base unit 12 is provided with a carrying arrangement, shown in the form of a belt clip 68 at the back face 26 of the housing 22.

Card 14 includes a selector in the form of a keypad 80 integrated with the body member 20 of the card 14 in the manner disclosed in the aforesaid U.S. Pat. No. 5,965,848. Keypad 80 includes number and symbol keys 82, as well as a "SEND" key 84 and an "END" key 86, all located at obverse face 88 of the body member 20. Enabling electrical connector elements are provided in the form of enabling contacts shown as electrical contacts 90 of an electrical connector 92 placed at reverse face 94 of body member 20. Card 14 further includes a microprocessor 100 within body member 20, and an identifier 110 and an interfacer 112 are placed within the card body 20 and are connected to the microprocessor 100. The keypad 80 is electrically connected to electrical contacts 90K of the electrical connector 92, and the microprocessor 100 is electrically connected to electrical contacts 90M of the electrical connector 92.

In the preferred embodiment, identifier 110 includes an identifier memory 120 programmed with a service account identification corresponding to a service account dedicated to card 14, the service account identification being in the form of an electronic serial number (ESN). The interfacer 112 preferably includes an interfacer memory 122 programmed with a dial code representing an interfacing telephone number, the telephone number preferably being a toll-free number for calling into a service provider.

Figure 6:
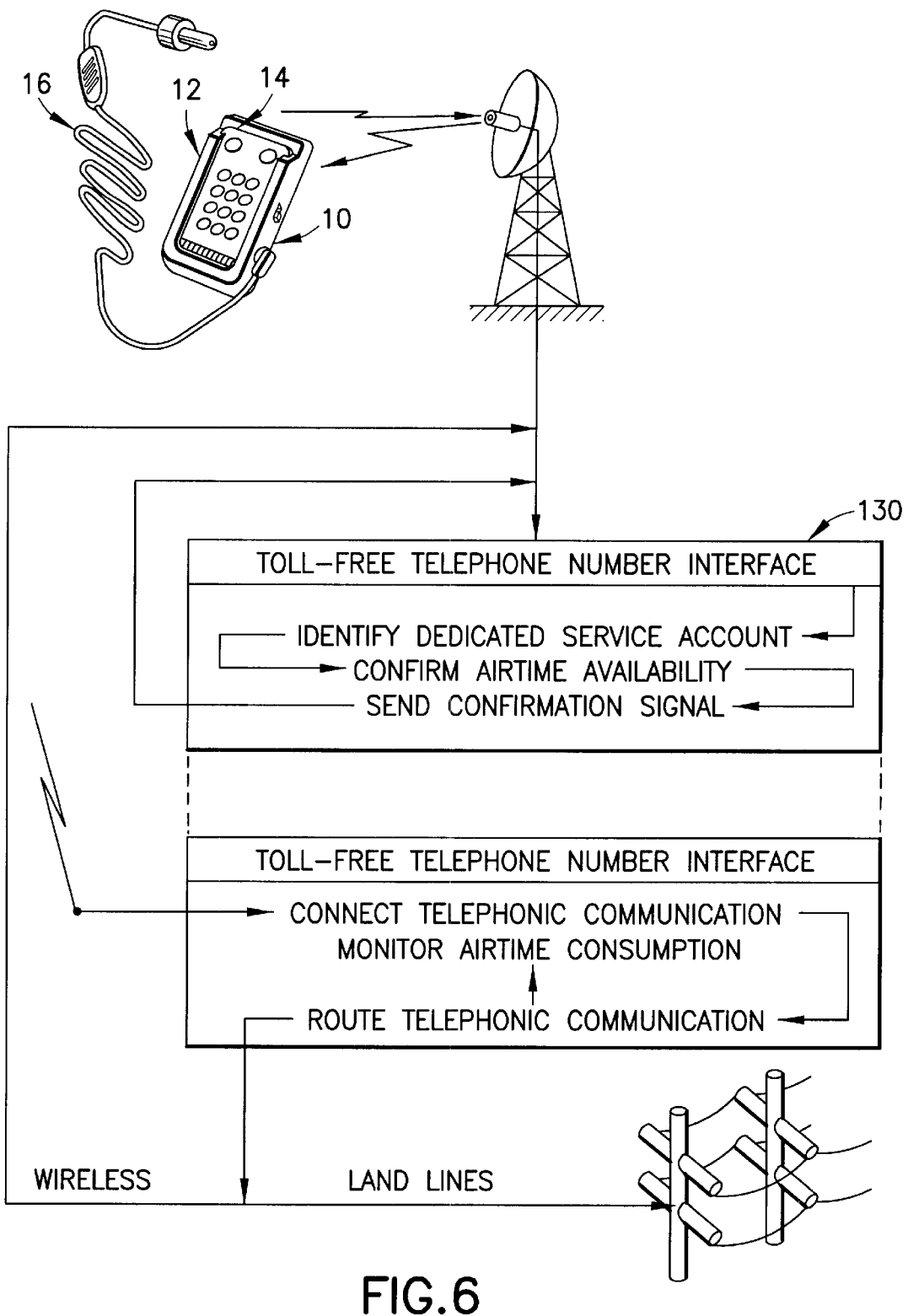
FIG. 6 is a diagrammatic illustration of a wireless telephonic communications system utilizing a telephone of the present invention.

In order to use telephone 10, a user will purchase a base unit 12 and a card 14. The card 14 is programmed with an ESN and a toll-free number leading to a service provider who maintains the service account identified by the ESN. The service account dedicated to card 14 is provided with a predetermined amount of airtime, as reflected in the purchase price of card 14. As seen in FIG. 6, card 14 is placed within base unit 12, effecting electrical connections between the electrical connectors 92 and 54. With the power switch 66 actuated to supply power, the toll-free number is dialed, in response to signals from the interfacer 112, and communication is established between the telephone 10 and the service provider 130. Signals from the identifier 110 are transmitted to the service provider 130 for verification of the authenticity of the dedicated service account and to confirm that the service account has airtime available for use. A confirmation signal then is transmitted from the service provider 130 to the telephone 10, enabling the user to initiate a telephonic communication, utilizing the keypad 80 to select a called number. The ensuing telephonic communication, having been authorized by the service provider 130, then is connected and routed by the service provider 130 to the recipient of the communication, either through land lines or through wireless means. The airtime consumed by telephonic communications is monitored by the service provider 130 and, upon the consumption of all of the airtime available in the service account dedicated to card 14, service is discontinued. The user then can discard card 14 and can purchase another card 14, for a purchase price determined by the amount of airtime made available in the service account dedicated to the new card 14. Alternately, the user can instruct the service provider 130 to replenish the service account with additional airtime, for an additional fee.

The arrangement of telephone 10 is available for functioning in a call-out mode only, or for the reception of incoming calls as well as for making outgoing calls. A construction which allows call-out only is somewhat less expensive to manufacture than a construction which enables the reception of incoming calls as well as the transmission of outgoing calls; however, a universal construction enabling both modes of operation is practical from a manufacturing standpoint, with the ability to operate in one or the other of the modes being controlled by the service provider, in response to information obtained by the service provider pertaining to the dedicated service account identified by a particular card 14.

The present telephone 10 provides a very compact and practical arrangement for making available wireless telephonic communication at a very reasonable cost to a user. Once a user is furnished with a base unit 12, all that is necessary to obtain and use a predetermined amount of airtime is the purchase of a card 14. There is no need to subscribe to a wireless service, there are no corresponding start-up fees, and there is no purchase of a relatively expensive telephone. Use of telephone 10 is renewable each time the airtime authorized by a card 14 is exhausted, simply by purchasing a new card 14, or by replenishing the airtime in the dedicated service account.

It will be seen that the present invention attains all of the objects and advantages summarized above, namely: Provides a modular arrangement which allows the use of relatively less expensive modules in a wireless telephone suitable for more widespread use and acceptance; enables greater convenience in carrying about and using wireless telephones; allows greater convenience in purchasing and using predetermined amounts of airtime; provides a simplified wireless telephone having both call-out and call-in capabilities; reduces potential hazards associated with electromagnetic radiation emanating from wireless telephones; allows greater convenience in providing power to a wireless telephone; provides greater versatility in the design and function of wireless telephones; enables the economical manufacture and distribution of relatively low-cost, reliable wireless telephones, thereby opening up new and larger markets for wireless telephones.

It is to be understood that the above detailed description of preferred embodiments of the invention is provided by way of example only. Various details of design and construction may be modified without departing from the true spirit and scope of the invention, as set forth in the appended claims.

The embodiments of the invention in which an exclusive property or privilege is claimed are defined as follows:

1. A compact modular wireless telephone for telephonic communications, the wireless telephone comprising:

an operator module including wireless telephonic operating circuitry, operator electrical connector elements connected to the wireless telephonic operating circuitry, and a power source for supplying power to the wireless telephonic operating circuitry;

an enabling module for being supplied separate from the operator module, the enabling module including a body member having limited dimensions, including a limited length, a limited width and a limited thickness, an identifier in the body member for identifying a service account dedicated to the enabling module, an interfacer in the body member, a selector integral with the body member, and enabling electrical connector elements connected to the identifier, the interfacer and the selector, the enabling electrical connector elements being complementary to corresponding operator electrical connector elements;

an antenna;

an earphone assembly;

a microphone assembly;

electrical connections for connecting the antenna, the earphone assembly and the microphone assembly with the wireless telephonic operation circuitry; and an interconnect for selectively connecting the enabling electrical connector elements with the operating electrical connector elements such that upon connecting the enabling electrical connector elements with the operating electrical connector elements, signals from the interfacer, the identifier, and the selector are transmitted by the wireless telephonic operating circuitry to interface the wireless telephone with a service provider, to identify the dedicated service account to the service provider for authorization of a telephonic communication, and to establish an authorized telephonic communication.

2. The invention of claim 1 wherein:

the interconnect includes a receptacle in the operator module, the receptacle being complementary to at least a portion of the body member of the enabling module for reception of at least the portion of the body member within the receptacle;

the operating electrical connector elements include operating contacts in the receptacle; and the enabling electrical connector elements include enabling contacts on the body member for connecting the enabling contacts with the operating contacts upon reception of at least the portion of the body member within the receptacle.

3. The invention of claim 1 wherein the electrical connections include an earphone connection at the operator module, and the earphone assembly is remote from the operator module and the enabling module and includes an earphone and elongate earphone electrical conductors for connecting the earphone to the operator module at the earphone connection.

4. The invention of claim 1 wherein the electrical connections include a microphone connection at the operating module, and the microphone assembly is remote from the operator module and the enabling module and includes a microphone and elongate microphone electrical conductors for connecting the microphone to the operator module at the microphone connection.

5. The invention of claim 1 wherein the antenna is located at the operator module.

6. The invention of claim 1 wherein the enabling module includes a microprocessor in the body member, and the interfacer is connected with the microprocessor and includes an interfacer memory programmed with an interfacing telephone number.

7. The invention of claim 1 wherein the enabling module includes a microprocessor in the body member, and the identifier is connected with the microprocessor and includes an identifier memory programmed with a service account identification corresponding to the dedicated service account.

8. The invention of claim 7 wherein the interfacer is connected with the microprocessor and includes an interfacer memory programmed with an interfacing telephone number.

9. The invention of claim 1 wherein the selector includes a keypad, the enabling electrical connector elements include selector electrical connector elements connected to the keypad, and the operator electrical connector elements include complementary selector electrical connector elements for connecting the keypad to the wireless telephonic operating circuitry upon connecting the enabling module with the operating module.

10. The invention of claim 9 wherein the interconnect includes a receptacle in the operator module, the receptacle being complementary to at least a portion of the body member of the enabling module for reception of at least the portion of the body member within the receptacle;

the operating electrical connector elements include operating contacts in the receptacle; and the enabling electrical connector elements include enabling contacts on the body member for connecting the enabling contacts with the operating contacts upon reception of at least the portion of the body member within the receptacle.

11. The invention of claim 10 wherein the wireless telephonic operating circuitry includes telephonic circuitry for sending outgoing telephonic communications, and the dedicated service account is provided with a predetermined amount of airtime such that upon identifying the dedicated service account, the service provider enables outgoing telephonic communications for the predetermined amount of airtime available in the dedicated service account.

12. The invention of claim 11 wherein the wireless telephonic operating circuitry includes telephonic circuitry for receiving incoming telephonic communications, and the dedicated service account is provided with a predetermined amount of airtime such that upon identifying the dedicated service account, the service provider enables incoming telephonic communications for the predetermined amount of airtime available in the dedicated service account.

* * * * *